United States Patent [19]

Beauch et al.

[11] Patent Number: 4,867,003

[45] Date of Patent: Sep. 19, 1989

[54] ENERGY ABSORBING STEERING COLUMN

[75] Inventors: Howard D. Beauch; Leland N. Olgren, both of Frankenmuth, Mich.

[73] Assignee: General Motors Corporation, Detroit, Mich.

[21] Appl. No.: 286,208

[22] Filed: Dec. 19, 1988

[51] Int. Cl.[4] .............................................. B62D 1/18
[52] U.S. Cl. ...................................... 74/492; 280/777
[58] Field of Search .......................... 74/492; 188/371; 280/777

[56] References Cited

U.S. PATENT DOCUMENTS

| | | |
|---|---|---|
| 3,392,599 | 7/1968 | White . |
| 3,590,655 | 7/1971 | Farrell et al. . |
| 3,748,922 | 7/1973 | Farrell . |
| 3,788,148 | 1/1974 | Connell et al. . |
| 3,877,319 | 4/1975 | Cooper .................... 188/371 X |
| 4,006,647 | 2/1977 | Oonuma et al. . |
| 4,028,961 | 6/1977 | Utsumi et al. ........................ 74/492 |
| 4,445,708 | 5/1984 | Oakes et al. ....................... 74/492 X |
| 4,774,851 | 10/1988 | Iwanami et al. ................... 74/492 X |

*Primary Examiner*—James R. Brittain
*Attorney, Agent, or Firm*—Saul Schwartz

[57] ABSTRACT

A collapsible, energy absorbing steering column with staged energy absorption. A sleeve around a lower mast jacket of the column has a primary part in the annulus defined by the overlap between the lower mast jacket and an upper mast jacket of the column and a secondary part outside the annulus. A plurality of primary roll deforming steel balls in interference in the annulus are also loosely received in pockets in the sleeve primary part. A plurality of secondary roll deforming steel balls are loosely received in the sleeve secondary part outside the annulus and held on the sleeve by a strippable retainer. When the column collapses, the secondary roll deforming steel balls enter the axially expanding overlap between the mast jackets to increase the level of energy absorption.

4 Claims, 2 Drawing Sheets

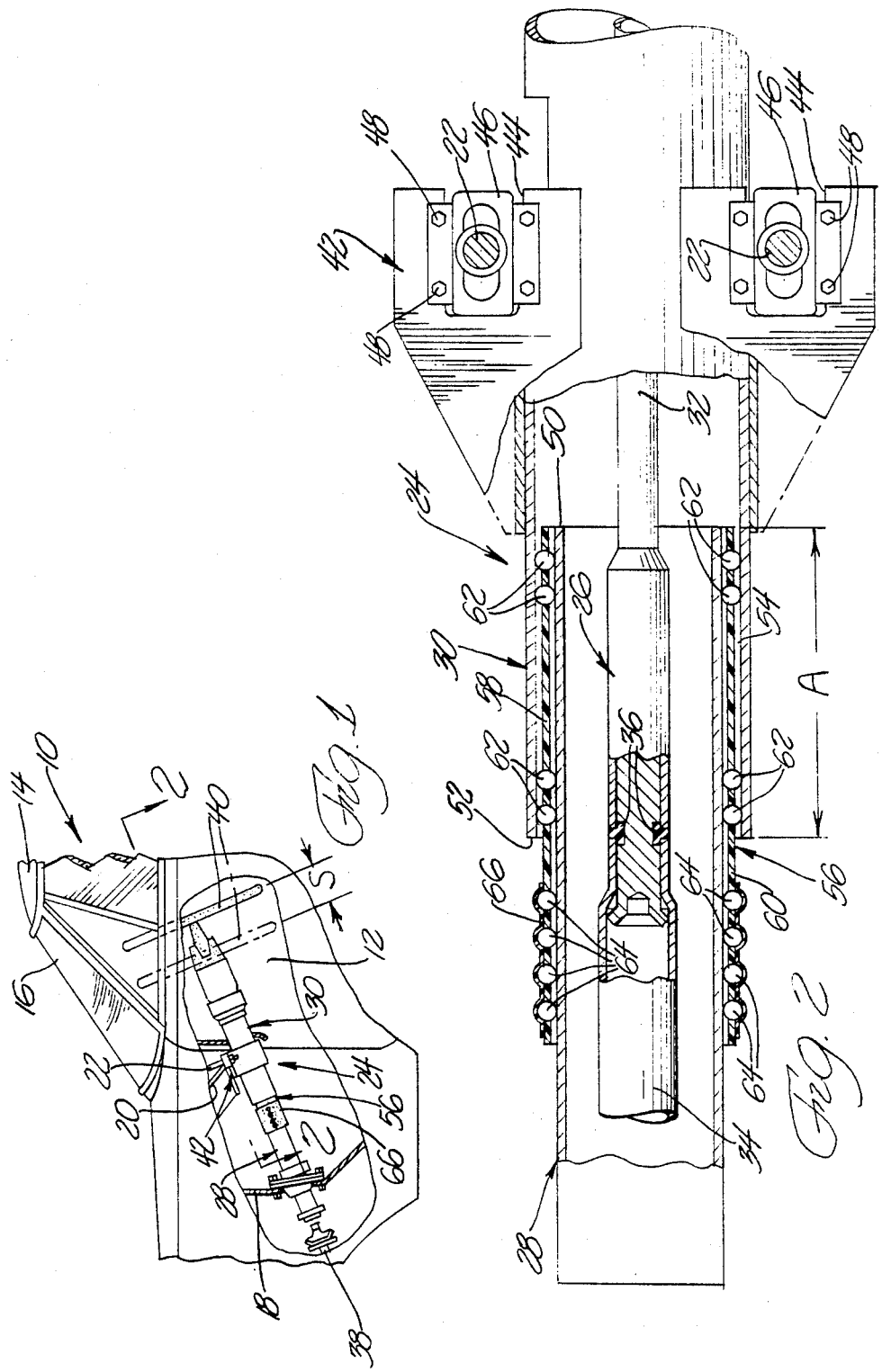

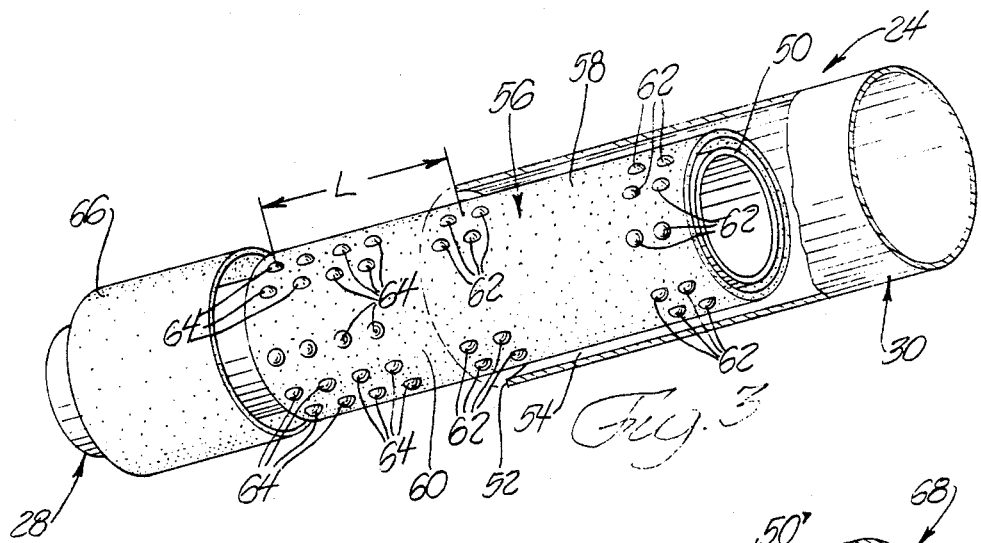
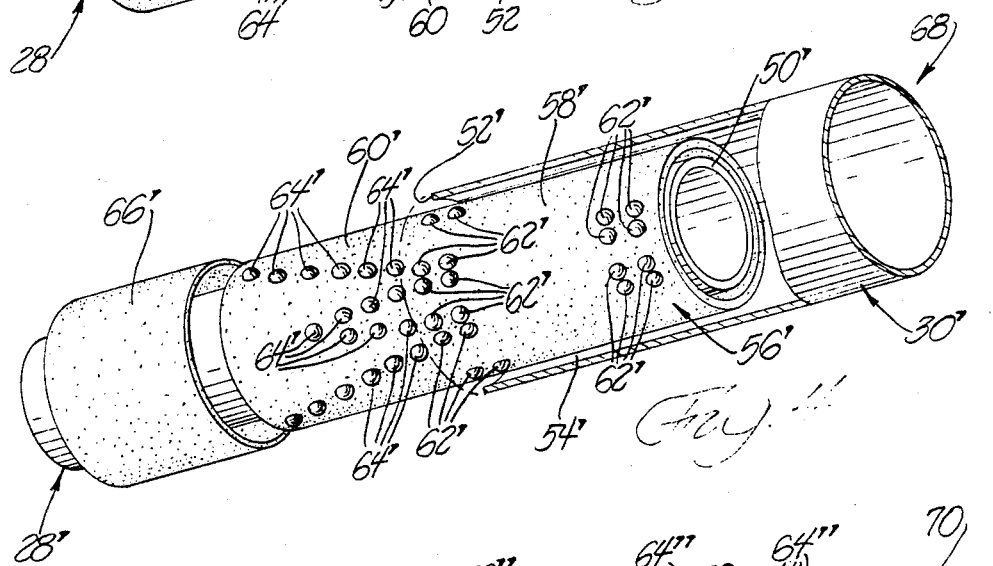
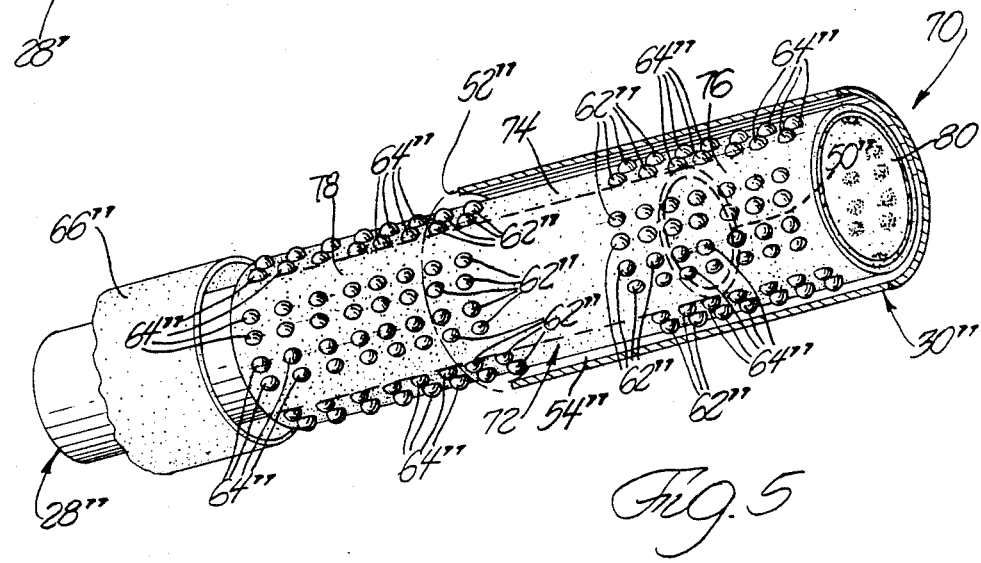

ENERGY ABSORBING STEERING COLUMN

FIELD OF THE INVENTION

This invention relates to collapsible, energy absorbing steering columns for automotive vehicles.

BACKGROUND OF THE INVENTION

U.S. Pat. No. 3392599, issued July 16, 1968 to White and assigned to the assignee of this invention, describes a collapsible steering column for automobiles wherein hard steel balls between overlapping ends of upper and lower mast jackets of the steering column roll tracks in the softer mast jackets during collapse of the steering column to absorb energy. U.S. Pat. No. 3788148, issued Jan. 29, 1974 to Connell et al and assigned to the assignee of this invention, describes a collapsible steering column embodying the same roll deformer energy absorption but further including preformed grooves in one of the mast jackets in which some of the hard steel balls are disposed. The grooves delay the onset of energy absorption by the corresponding ones of the steel balls and thereby tailor or stage the energy absorbing performance of the steering column. That is, during collapse of the steering column, the steel balls in the grooves do not achieve interference with the surrounding overlapped portions of the mast jackets until the collapse distance exceeds the length of the grooves. A collapsible steering column according to this invention achieves similar staged energy absorbing performance but without mast jacket grooves which must be closely controlled and, therefore, are relatively expensive to manufacture.

SUMMARY OF THE INVENTION

This invention is a new and improved collapsible, energy absorbing steering column for automotive vehicles. The collapsible steering column according to this invention has a plurality of primary roll deformers in an annulus between telescopically overlapped upper and lower mast jackets of the column, a plurality of secondary roll deformers outside the axial extent of the overlap between the mast jackets, and means for maintaining the relative positions of the primary and secondary roll deformers during collapse of the steering column so that the secondary roll deformers become operatively lodged in the annulus between the mast jackets after a predetermined axial collapse to initiate secondary or staged energy absorption. In a preferred embodiment of the steering column according to this invention, the primary and secondary roll deformers are loosely supported in respective primary and secondary parts of a plastic sleeve, the primary part of the sleeve being disposed in the overlap between the upper and lower mast jackets in the normal, uncollapsed condition of the steering column and the secondary part being outside the overlap. In a modified embodiment of the steering column according to this invention, the plastic sleeve has two secondary parts on opposite sides of the primary part so that secondary roll deformers enter the overlap between the mast jackets from both ends of the overlap.

BRIEF DESCRIPTION OF THE DRAWINGS

FIG. 1 is a partially broken away elevational view of an automobile vehicle body having an energy absorbing collapsible steering column according to this invention;

FIG. 2 is an enlarged view taken generally along the plane INDICATED by lines 2-2 in FIG. 1;

FIG. 3 is a partially exploded perspective view of a portion of FIG. 2;

FIG. 4 is similar to FIG. 3 but showing a first modified embodiment of the steering column according to this invention; and FIG. 5 is similar to FIG. 3 but showing a second modified embodiment of the steering column according to this invention.

DESCRIPTION OF PREFERRED EMBODIMENTS

Referring to FIG. 1 of the drawings, an automobile vehicle body 10 includes a passenger compartment 12 defined, in part, by a roof 14, a front windshield 16, and a lower panel structure 18 below the windshield. A structurally rigid instrument panel support structure 20 of the vehicle body is disposed at the front of the passenger compartment and includes a pair of hanger bolts 22, FIGS. 1 and 2, projecting generally vertically down. The hanger bolts are threaded at their distal ends and, as described below, releasably support the upper end of a collapsible, energy absorbing steering column 24 according to this invention.

As seen best in FIGS. 1 and 2, the steering column 24 includes a steering shaft assembly 26, a tubular lower mast jacket 28, and a tubular upper mast jacket 30. The steering shaft assembly 26 has an upper shaft 32 and a lower shaft 34. The lower end of the upper shaft has a non-circular cross section and is telescopically received in a correspondingly shaped tubular upper end of the lower shaft 34 whereby the shafts are rotatable as a unit and longitudinally collapsible. A plurality of insitu molded plastic shear pins 36 maintain the relative positions of the upper and lower shafts 32 and 34.

The lower end of the lower shaft 34 is connected to a steering gear 38 of the vehicle, FIG. 1. The upper shaft is rotatably supported on the upper mast jacket by a bearing, not shown, near the top of the upper mast jacket which bearing, additionally, transfers axial forces from the steering shaft 32 to the upper mast jacket. A steering wheel 40 is connected to the upper end of the upper shaft 32 for unitary rotation therewith. The shaft assembly 26 transfers steering input at the steering wheel 40 to the steering gear 38 in conventional fashion.

The tubular upper mast jacket has a bracket 42 rigidly attached near the top of the mast jacket. The bracket 42 has a pair of slots 44 therein open toward the steering wheel 40. Each slot 44 has a capsule 46 retained therein by insitu injection molded pins 48. The hanger bolts 22 extend through slots in corresponding ones of the capsules 46. Nuts, not shown, on the distal ends of the hanger bolts hold the bracket 42 against appropriate stops on the hanger bolts whereby the steering column is held in an operative position relative to the instrument panel structure. In the event of a significant forward impact on the steering wheel 40, the pins 48 shear and release the bracket 42 to permit axial collapse of the steering column through a total collapse stroke S, FIG. 1.

As seen best in FIGS. 2 and 3, the lower mast jacket 28 has a circular upper end 50 and the upper mast jacket 30 has a circular lower end 52. The diameter of the upper mast jacket is greater than the diameter of the lower mast jacket and telescopically overlaps the latter such that an annulus 54 is defined between the upper and lower mast jackets. In a normal or uncollapsed condition of the steering column 24, FIGS. 1-3, the annulus 54 has an axial extent or dimension A, FIG. 2, between the ends 50 and 52 of the mast jackets.

A plastic sleeve 56 is disposed loosely around the lower mast jacket 28. The sleeve 56 has a primary part 58 in the annulus 54 and a secondary part 60 below and to the left, FIGS. 1 and 2, of the lower end 52 of the upper mast jacket. A plurality of hard steel ball primary roll deformers 62 are relatively loosely received in pockets in the primary part 58 of the sleeve 56 such that the relative positions of the balls is maintained while the balls are still free to roll. The primary roll deformers are arrayed in two axially spaced pairs of circular rows. The primary roll deformers 62 have an interference fit between the upper and lower mast jackets in the annulus 54 in the normal or uncollapsed condition of the steering column 24. The primary roll deformers tightly connect the mast jackets and the axial span between the pairs of rows of primary roll deformers imparts stability with respect to bending loads.

A plurality of hard steel ball secondary roll deformers 64 are relatively loosely received in pockets in the secondary part 60 of the sleeve 56. The balls 64 are retained in the pockets in the sleeve 56 by a light-weight tubular retainer 66 of any suitable construction. The balls 64 are the same size as the primary roll deformers 62 and are arrayed in a plurality of axially spaced circular rows the most remote of which has an axial span L from the bottom pair of rows of primary roll deformers 62, FIGS. 3.

When the steering wheel 40 is impacted in the forward direction with sufficient force to free the bracket 42 from the capsules 46, the upper mast jacket 30 collapses telescopically over the lower mast jacket 28. At the onset of collapse, the primary roll deformers 62 absorb energy at a first level as they roll tracks into the upper and lower mast jackets. The sleeve 56 maintains the relative positions of the primary and secondary roll deformers as the dimension A of the overlap between the mast jackets increases.

When the steering column 24 has collapsed to where the lower end 52 of the upper mast jacket 30 is at the uppermost circular row of secondary roll deformers 64, the latter are enveloped with an interference fit in the axially expanding annulus 54. The secondary roll deformers in that circular row then commence energy absorption as they roll tracks in the upper and lower mast jackets with continued steering column collapse so that the total energy absorbed by the steering column increases to a second level. Of course, the tubular retainer 66 is stripped off of the secondary roll deformers as they enter the annulus 54. As collapse of the steering column proceeds toward the maximum stroke S, FIG. 1, additional circular rows of secondary roll deformers 64 enter the annulus 54 and increase the total amount of energy absorbed in corresponding stages.

An important feature of this invention is the increasing axial span between the uppermost circular row of primary roll deformers 62 and the lowermost circular row of the secondary roll deformers 64 within the axially expanding annulus 54. By increasing this axial span to about the sum of the initial annulus length dimension A and the span L, the lateral and vertical stability of the steering column is enhanced for improved performance in the event that the collapse inducing impact is not aligned on the longitudinal centerline of the steering column.

Referring to FIG. 4, a portion of a modified steering column 68 according to this invention is illustrated. In FIG. 4, elements common to the steering column 24 are identified by primed reference characters. In the modified steering column 68, the primary roll deformers 62' are arrayed in a pair of lower circular rows and in partial circular rows at the top of the annulus 54, designed primarily of lateral stability. Thus, at the onset of steering column collapse, primary energy absorption is effected at the lower pair of circular rows of roll deformers 62' as the latter roll tracks in the upper and lower mast jackets.

In the modified steering column 68, the plurality of secondary roll deformers 64' are arrayed in a plurality of axially spaced rows and are circumferentially offset from row to row so that as successive circular rows enter the axially expanding annulus 54', the secondary roll deformers commence rolling new tracks in the upper and lower mast jackets.

Referring to FIG. 5, a portion of a second modified steering column 70 according to this invention is illustrated. In FIG. 5, elements common to the steering column 24 are identified with twice primed reference characters. The second modified steering column 70 has a plastic sleeve 72 loosely fitted around the lower mast jacket 28". The plastic sleeve 72 has a primary part 74 in the annulus 54" defined by the overlap of the mast jackets in their normal, uncollapsed relative positions. The sleeve 72 has a first or upper secondary part 76 extending beyond of the upper end 50" of the lower mast jacket and a second or lower secondary part 78 extending below the lower end 52" of the upper mast jacket. Neither of the first and second secondary parts 76 and 78 are in the annulus 54" defined by the overlap of the upper and lower mast jackets in the normal, uncollapsed relative position of the steering column.

The primary roll deformers 62" are disposed in the primary part 74 of the sleeve 72. A first plurality of hard steel ball secondary roll deformers 64" are loosely disposed in pockets in the upper secondary part 76 in a plurality of axially spaced circular rows. A second plurality of hard steel ball secondary roll deformers 64" are loosely disposed in pockets in the lower secondary part 78 in a plurality of axially spaced circular rows. An inner tubular retainer 80 is disposed within the upper secondary part 76 to retain the secondary roll deformers in their respective pockets. An outer tubular retainer 66" is disposed around the lower secondary part 78 to retain the secondary roll deformers in their respective pockets.

The modified steering column 70 operates like the steering column 24 except that during collapse the secondary roll deformers 64" in the upper and lower secondary parts of the sleeve 72 enter the axially expanding annulus 54" from opposite ends. With secondary roll deformers commencing operation at opposite ends of the annulus, additional flexibility in staging the onset and magnitude of secondary energy absorption is achieved.

The embodiments of the invention in which an exclusive property or privilege is claimed are defined as follows:

1. In an energy absorbing steering column including a lower tubular mast jacket having an upper end, an upper tubular mast jacket having a lower end overlapping said lower mast jacket upper end whereby an annulus is defined therebetween extending longitudinally from said lower mast jacket upper end to said upper mast jacket lower end, said upper mast jacket being telescopically collapsible relative to said lower mast jacket through a working stroke, and a plurality of primary roll deformers disposed in said annulus in interference fit between said upper and said lower mast jackets so that longitudinal collapse of said upper mast jacket relative to said lower mast jacket is accompanied by energy absorbing cold working of each of said upper and said lower mast jackets, and the improvement comprising:

a tubular plastic sleeve around said lower mast jacket having a primary part in said annulus between said upper and said lower mast jackets and a first secondary part adjacent said primary part and outside said annulus, each of said primary roll deformers being loosely received in said sleeve primary part so that the relative positions of said primary roll deformers is maintained during relative telescopic collapse of said upper mast jacket, a first plurality of secondary roll deformers loosely received in said sleeve secondary part outside said annulus whereby the positions of said first plurality of secondary roll deformers relative to said primary roll deformers is maintained during relative telescopic collapse of said upper mast jacket so that said first plurality of secondary roll deformers enter said annulus the axial dimension of said annulus expands during relative telescopic collapse of said upper mast jacket, and a first strippable retainer engaging said first plurality of secondary roll deformers outside said annulus between said upper and said lower mast jackets to maintain said first plurality of secondary roll deformers on said sleeve first secondary part.

2. The collapsible steering column recited in claim 1 wherein each of said first plurality of secondary roll deformers is a hard steel ball having a diameter assuring an interference fit in said annulus so that said first plurality of secondary roll deformers effects energy absorption after entry into said annulus.

3. The collapsible steering column recited in claim 2 and further including:

means on said plastic sleeve defining a second secondary part adjacent said primary part and on the opposite side of said primary part from said first secondary part, said second secondary part being disposed outside said annulus between said upper and said lower mast jackets, a second plurality of secondary roll deformers loosely received in said sleeve second secondary part outside said annulus whereby the positions of said second plurality of secondary roll deformers relative to said primary roll deformers is maintained during relative telescopic collapse of said upper mast jacket so that said second plurality of secondary roll deformers enter said annulus from the end thereof opposite said first plurality of secondary roll deformers the axial dimension of said annulus expands during relative telescopic collapse of said upper mast jacket, and a second strippable retainer engaging said second plurality of secondary roll deformers outside said annulus between said upper and said lower mast jackets to maintain said second plurality of secondary roll deformers on said sleeve second secondary part.

4. The collapsible steering column recited in claim 3 wherein each of said second plurality of secondary roll deformers is a hard steel ball having a diameter assuring an interference fit in said annulus so that said second plurality of secondary roll deformers effects energy absorption after entry into said annulus.

* * * * *